(12) United States Patent
Sumpter

(10) Patent No.: US 12,057,760 B2
(45) Date of Patent: Aug. 6, 2024

(54) VARIABLE RELUCTANCE AND HUMAN RESPIRATION POWER GENERATOR

(71) Applicant: James Bernard Sumpter, Noblesville, IN (US)

(72) Inventor: James Bernard Sumpter, Noblesville, IN (US)

(*) Notice: Subject to any disclaimer, the term of this patent is extended or adjusted under 35 U.S.C. 154(b) by 0 days.

(21) Appl. No.: 18/459,061

(22) Filed: Aug. 31, 2023

(65) Prior Publication Data

US 2024/0120803 A1 Apr. 11, 2024

Related U.S. Application Data

(60) Provisional application No. 63/412,818, filed on Oct. 3, 2022.

(51) Int. Cl.

| | |
|---|---|
| H02K 7/18 | (2006.01) |
| H02K 35/02 | (2006.01) |
| H02N 11/00 | (2006.01) |
| F03G 5/06 | (2006.01) |

(52) U.S. Cl.
CPC .......... H02K 7/1853 (2013.01); H02K 35/02 (2013.01); H02N 11/002 (2013.01); *F03G 5/066* (2021.08)

(58) Field of Classification Search
CPC ...... H02K 7/1853; H02K 35/02; F03G 5/066; H02N 1/002
USPC ......................................................... 310/20
See application file for complete search history.

(56) References Cited

U.S. PATENT DOCUMENTS

| | | | | |
|---|---|---|---|---|
| 2,029,148 A | * | 1/1936 | Archer ................. | H02K 7/1853 310/75 B |
| 3,268,845 A | * | 8/1966 | Whitmore ............ | A61B 5/1135 600/534 |
| 4,245,640 A | * | 1/1981 | Hunt .................... | H02K 7/1876 607/33 |
| 4,912,769 A | * | 3/1990 | Erbe ..................... | H04R 25/554 381/322 |
| 5,358,461 A | * | 10/1994 | Bailey, Jr. ............ | A63B 21/153 290/1 R |
| 7,361,999 B2 | * | 4/2008 | Yeh ...................... | H02K 7/1853 290/1 R |

(Continued)

FOREIGN PATENT DOCUMENTS

| | | | | |
|---|---|---|---|---|
| KR | 20190143779 A | * | 12/2019 | |
| WO | WO-2016005584 A1 | * | 1/2016 | ......... A63B 21/0055 |

*Primary Examiner* — Maged M Almawri

(57) ABSTRACT

This invention is an apparatus to produce electrical power from the wearer's respiration through the application of a circular cluster of Variable Reluctance sensors that are excited by a rotating disk holding a plurality of magnets arranged radially, on its face, and spaced uniformly about its circumference. The sensors' arrangement conforms to the circumference and are perpendicular to the face of the rotating disk. This arrangement produces corresponding sinusoidal voltages that are each converted to DC via a corresponding rectifier circuit. The resulting DC voltage outputs are then summed to produce a single power output, which is fed to a DC-to-DC converter. The rotating disk's unidirectional motion is produced by a ratchet gear system attached to a partially elastic torso garment, which is worn on the mid torso. The ratchet gear system moves proportionally, in response to the reciprocal motion of a wearer's respiration.

12 Claims, 12 Drawing Sheets

(56) References Cited

U.S. PATENT DOCUMENTS

| | | | | |
|---|---|---|---|---|
| 7,638,889 B2 * | 12/2009 | Yeh | ...................... | H02K 7/1853 |
| | | | | 290/1 R |
| 7,729,767 B2 * | 6/2010 | Baker, III | ............ | H02K 7/1876 |
| | | | | 607/35 |
| 8,581,426 B2 * | 11/2013 | Seike | ...................... | H02K 35/04 |
| | | | | 290/1 R |
| 9,190,886 B2 * | 11/2015 | Stanton | ...................... | F03G 5/06 |
| 9,362,803 B2 * | 6/2016 | Panousis | ................... | H02J 7/34 |
| 10,263,494 B2 * | 4/2019 | Spencer | ................... | H02J 7/345 |
| 10,454,297 B2 * | 10/2019 | Zhang | ...................... | H02J 50/70 |
| 10,491,003 B2 * | 11/2019 | Amin | ................... | H02M 3/1588 |
| 11,133,730 B2 * | 9/2021 | Petrovic | ................. | H02K 11/30 |
| 11,699,962 B2 * | 7/2023 | Wang | ................... | A61B 5/082 |
| | | | | 310/20 |
| 11,779,796 B2 * | 10/2023 | Larson | ............... | A63B 21/4043 |
| | | | | 482/139 |
| 2006/0184206 A1 * | 8/2006 | Baker, III | .............. | H02K 35/06 |
| | | | | 607/35 |
| 2007/0096469 A1 * | 5/2007 | Yeh | ...................... | H02K 7/1853 |
| | | | | 290/1 R |
| 2017/0063198 A1 * | 3/2017 | Spencer | ................... | H02J 7/345 |
| 2020/0099319 A1 * | 3/2020 | Wang | ................... | H02N 11/002 |

* cited by examiner

VARIABLE RELUCTANCE AND HUMAN RESPIRATION POWER GENERATOR

CROSS-REFERENCE TO RELATED APPLICATIONS

Related Application

Application No. 63/412,818 (Provisional Patent)
Filing Date: Oct. 3, 2022
Title: Variable Reluctance and Human Respiration Power Generator
Inventor: James Bernard Sumpter, Noblesville, IN
Applicant: James Bernard Sumpter, Noblesville, IN
This application is non-provisional and claims the benefit of U.S. Provisional Patent Application No. 63/412,818, filed Oct. 3, 2022 the specification of which is incorporated herein in its entirety by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

AN INCORPORATION BY REFERENCE STATEMENT

Not Applicable

STATEMENT REGARDING PRIOR DISCLOSURES BY THE INVENTOR OR A JOINT INVENTOR

James Bernard Sumpter, the Inventor, has the following prior disclosures:
1) Provisional Patent:
   Inventor: James Bernard Sumpter
   Application No. 63/412,818
   Filing Date: Oct. 3, 2022
   Title: Variable Reluctance and Human Respiration power Generator

BACKGROUND OF THE INVENTION

There have been numerous inventions that have dealt with the generation of electrical power that is derived from human motion. Most of these inventions have to do with power that is generated by the movement of the limbs. A smaller subset are inventions that derive energy based on the general motion of the human subject. However, there are three versions of prior art that derive their power by converting motion, due to human respiration, to electrical energy. They operate when they are worn, whether the user is sedentary or in motion, just as the current invention does. In addition, the earliest of these inventions (U.S. Pat. No. 2,029,148 A) uses a ratchet and pawl assembly (although different from the current invention) to assist in converting reciprocal motion to rotary motion. The second invention (U.S. Pat. No. 4,245,640 A) relies on a change in magnetic flux to generate power. Although, its configuration is different from the current invention in that its motion is purely reciprocal and limited to the unmodified low frequencies of natural respiration, which results in a lower energy output. The third and most recent invention (U.S. Pat. No. 11,699,962 B2) uses a generator similar to the first invention, but a different method of converting reciprocal motion to rotary motion.

The significant distinction of this invention is that it produces substantially more power. For example, the second invention likely produces power in the microwatt range, at about $1/400^{th}$ the power output of the current invention. The first invention likely has a power output similar to the most recent prior art. The most recent prior art claims to produce 0.01 watt of power, which when compared to the current invention, is less than $1/13^{th}$ the power on the low end and less than $1/78^{th}$ the power on the high end. In addition, unlike the most recent prior art, the current invention uses no control circuitry or LED displays, thereby losing no power to these features, which could consume more than 0.01 watt. In addition, the current invention uses a DC-to-DC converter as the final output stage of the preferred embodiment. This feature allows for a regulated output and a range of output voltages.

FIELD OF THE INVENTION

This invention has to do with the generation, conversion, or distribution of electrical power worn by humans and the conversion of reciprocal motion to rotary motion. Specifically, this invention deals with power that is generated due to human respiration.

DESCRIPTION OF THE RELATED ART

The Following is a description of the related art:

| | | |
|---|---|---|
| U.S. Ser. No. 11/699,962 B2 | Jul. 11, 2023 | Yun Wang; Guohao Liu |
| U.S. 2017/0133953 A1 | May 11, 2017 | Gross et al. |
| U.S. 2017/0033589 A1 | Feb. 2, 2017 | ZHANG et al. |
| U.S. 2013/0104425A1 | May 2, 2013 | Kalra-Lall |
| U.S. 2011/0285146 A1 | Nov. 24, 2011 | Inna Kozinsky et al. |
| U.S. Pat. No. 10,454,297 B2 | Oct. 22, 2019 | Zhang et al. |
| U.S. Pat. No. 10,326,312 B2 | Jun. 18, 2019 | Kim et al. |
| U.S. Pat. No. 10,263,494 B2 | Apr. 16, 2019 | Spencer et al |
| U.S. Pat. No. 10,153,683 B2 | Dec. 11, 2018 | Shastry et al. |
| U.S. Pat. No. 10,021,236 B2 | Jul. 10, 2018 | Esenwein et al. |
| U.S. Pat. No. 9,407,125 B2 | Aug. 2, 2016 | Shepertycky et al. |
| U.S. Pat. No. 9,362,803 B2 | Jun. 7, 2016 | Panousis et al. |
| U.S. Pat. No. 9,303,628 B2 | Apr. 5, 2016 | Fortier et al. |
| U.S. Pat. No. 9,190,886 B2 | Nov. 17, 2015 | Stanton et al. |
| U.S. Pat. No. 7,638,889 B2 | Dec. 29, 2009 | Ming-Hsiang Yeh |
| U.S. Pat. No. 7,361,999 B2 | Apr. 22, 2008 | Ming-Hsiang Yeh |
| U.S. Pat. No. 7,345,372 B2 | Mar. 18, 2008 | Roberts et al. |
| U.S. Pat. No. 7,327,046 B2 | Feb. 5, 2008 | Alexander Benjamin Biamonte |
| U.S. Pat. No. 7,105,939 B2 | Sep. 12, 2006 | Vladimir Bednyak |
| U.S. Pat. No. 6,822,343 B2 | Nov. 23, 2004 | Leonardo W. Estevez |
| U.S. Pat. No. 5,358,461 | Oct. 25, 1994 | Russell M. Bailey, Jr |
| U.S. Pat. No. 4,245,640 A | Jan. 20, 1981 | Robert J. Hunt |
| U.S. Pat. No. 2,029,148 A | Jan. 28, 1936 | George F. Archer |

SUMMARY OF THE INVENTION

The Variable Reluctance and Human Respiration Power Generator (VRHRPG) invention is a system worn by humans, in the mid torso area (where there is maximum expansion during inhalation) to produce a DC power output. The invention uses the motion from human respiration, variable reluctance (VR) sensors and rotation from exciting magnets to generate power. The rotation of the magnets is driven by the torso expansion and contraction due to respiration.

This invention provides an independent portable source of power that can be used to power electronic devices wherever the user chooses, including remote locations and power deserts.

This invention uses no external source of power and contains no internal power source, such as batteries.

BRIEF DESCRIPTION OF THE DRAWINGS

The features of this invention will now be described with reference to the drawings of the bench embodiment as applied to a preferred embodiment, which are intended to illustrate and not limit the invention.

DETAILED DESCRIPTION OF THE PREFERRED EMBODIMENT, WHICH IS BASED ON THE BENCH SYSTEM EMBODIMENT

Along with the description of the bench embodiment, a detailed description of a preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

An adult's respiration frequency, at rest, is 12 to 20 breaths a minute. During vigorous exercise, an adult's respiration frequency can reach 60 breaths a minute. This invention will operate over this range to provide between 0.130 and 0.156 watts of power (see section on enhancements to the preferred embodiment: pp 24-28), when the user is awake or asleep, standing, walking, or sitting; and up to 0.782 watts, while the user is running or doing other vigorous activity; 24 hours a day.

The VR sensor is a device, which contains a permanent magnet wrapped in a wire coil, with the magnet fixed to a ferromagnetic pole piece. The number of turns in the wire coil is designated by the letter (N). The VR sensor, when its pole piece is exposed to a change in magnetic flux, produces a sinusoidal or near sinusoidal voltage pulse. Typically, a variable reluctance sensor's voltage pulse is used to determine the speed or position of a ferromagnetic target. This invention uses variable reluctance sensors, in a novel way, to produce electrical power. In this invention, the VR sensors' sinusoidal voltage is converted to DC voltage using a full wave Schottky diode bridge rectifier. In the VRHRPG system, the pulses from the variable reluctance sensors are generated by rotating a plurality of magnets perpendicular to and in close proximity to the VR sensors pole piece. The power (P) of the VRHRPG system is the product of the rectified VR sensor voltage (V) and the system current (I). In the VRHRPG system, the voltage (V) is a function of the magnetic flux, $\Phi$(phi), of the magnets on the rotatable disk and a function of the magnitude of the flux rate of change $$\left(\frac{d\Phi}{dt}\right)$$

of the VR sensors, which is dependent on the speed of the rotatable disk. The VRHRPG system uses human respiration, which is a reciprocal motion, to drive the rotatable disk with magnets. To drive the rotatable disk, the respiration's reciprocal motion is converted to rotary motion using a ratchet and pawl assembly in combination with a gear train.

Figure 1:
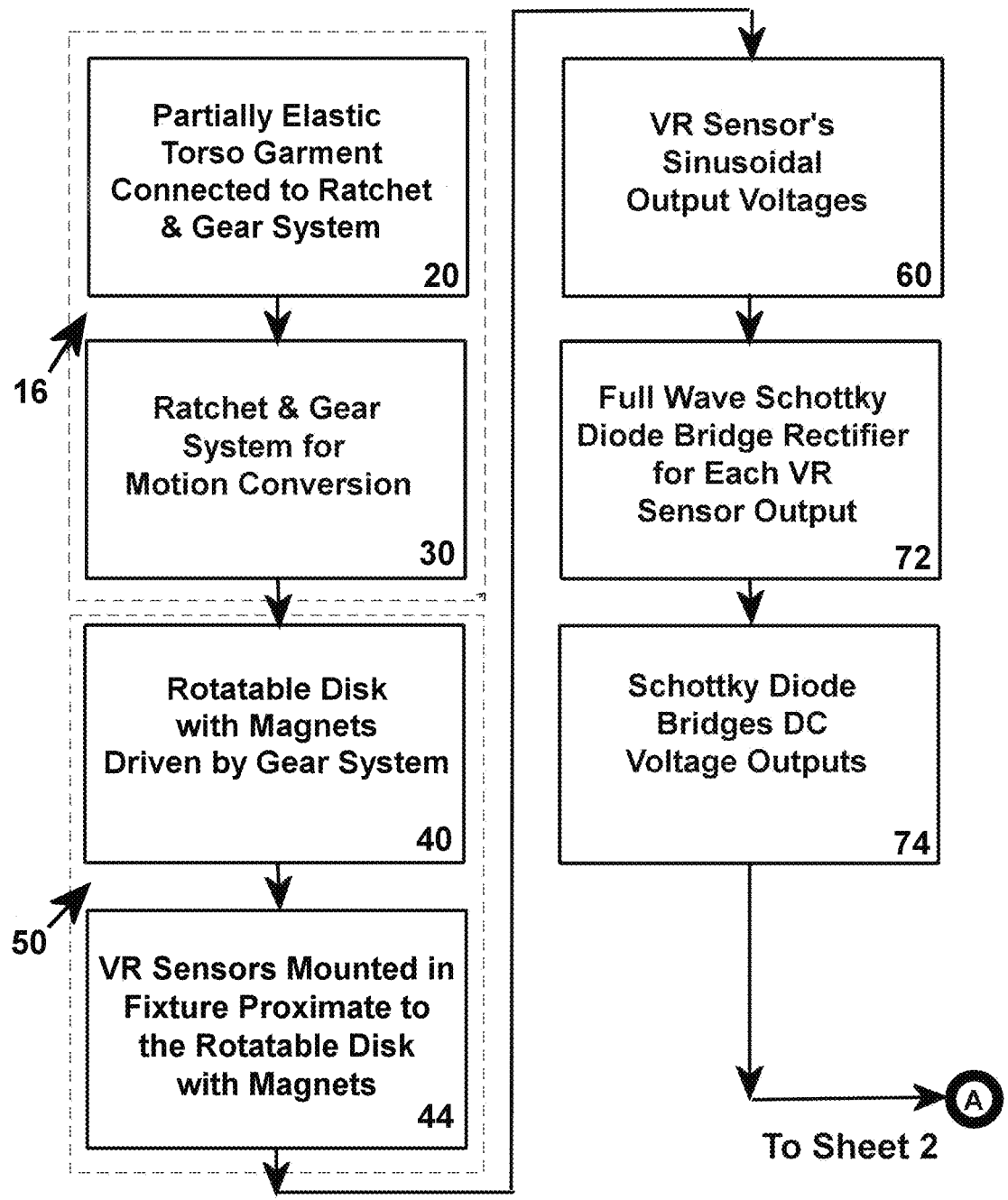
FIG. 1 is a block diagram which shows the relationship of the components of this invention.
Figure 1A:
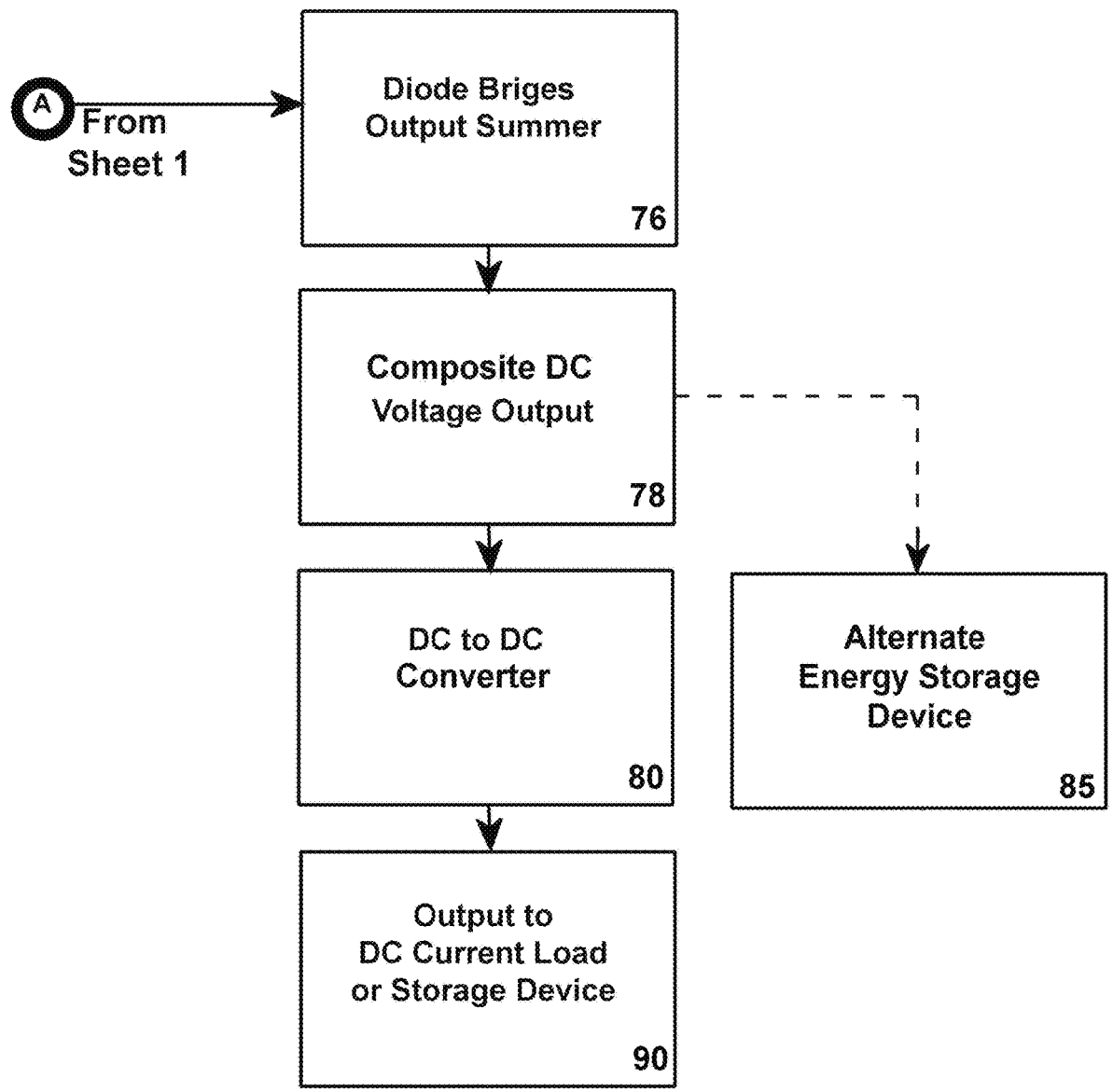
FIG. 1A is a continuation of the block diagram.

FIGS. 1 and 1A show a block diagram of the VRHRPG system. The blocks are numbered to correspond to the various components of the invention. It includes block 16 which is a bench simulation of the motion (blocks 20 and 30) derived from the user's respiration and used to drive the rotatable disk with magnets. Block 50 is the bench implementation of the rotatable disk with magnets (block 40 in relation to the VR sensor block 44). The VR sensors 44 each produce a train of sinusoidal output voltage pulses 60, which is input to a corresponding full wave Schottky diode bridge rectifier 72. The bridge rectifiers 72 each produce a DC output which is series summed in pairs to produce output voltage 74. FIG. 1-A, shows that the output voltage 74 is fed to an output summing circuit 76, which produces a composite DC output voltage 78. The DC output voltage 78 is fed to an electrical output device. In the preferred embodiment the electrical output device is a DC-to-DC converter 80, which produces an output 90 to a DC current load. In the preferred embodiment, the DC-to-DC converter 80 is a buck converter.

FIG. 1-A also comprehends an alternate embodiment in which the composite DC output voltage 78 is fed to an electrical output device, which is an energy storage device 85.

Figure 2:
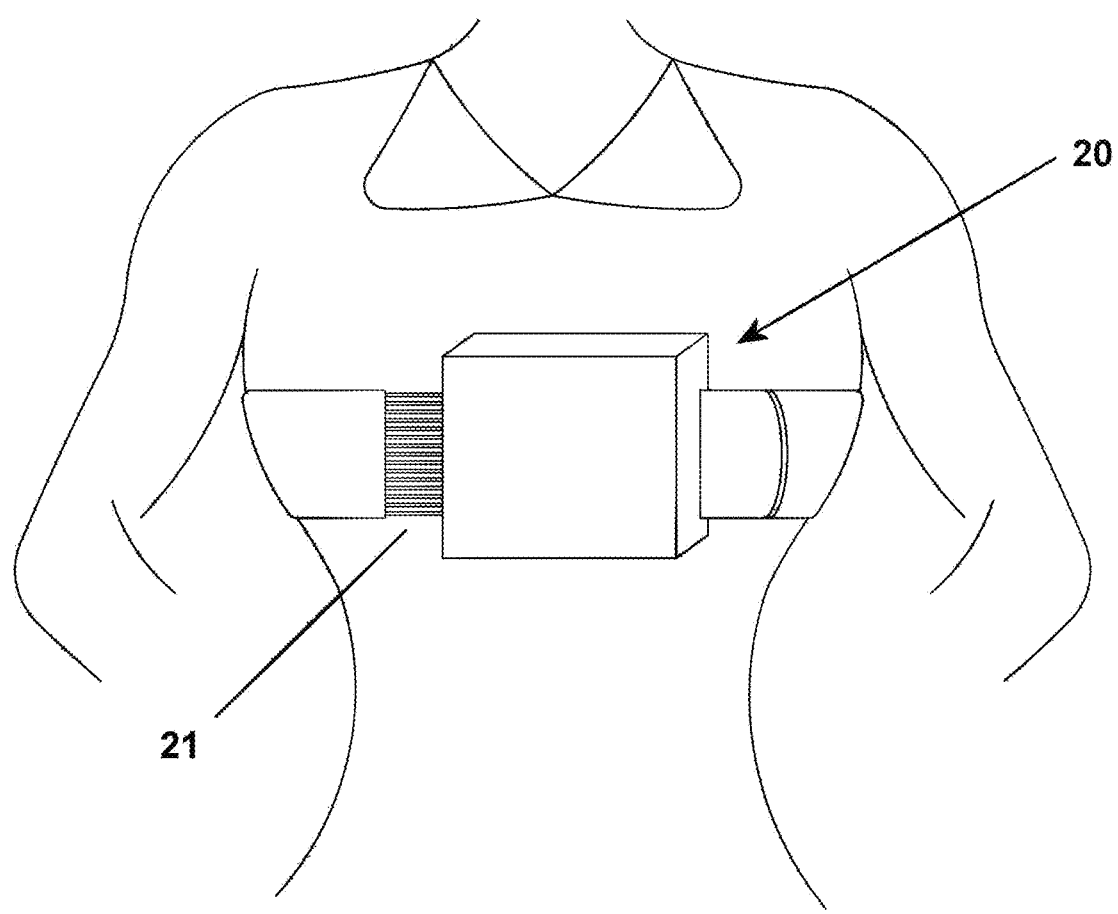
FIG. 2 shows how the invention will be worn by the user.
Figures 4, 4A:
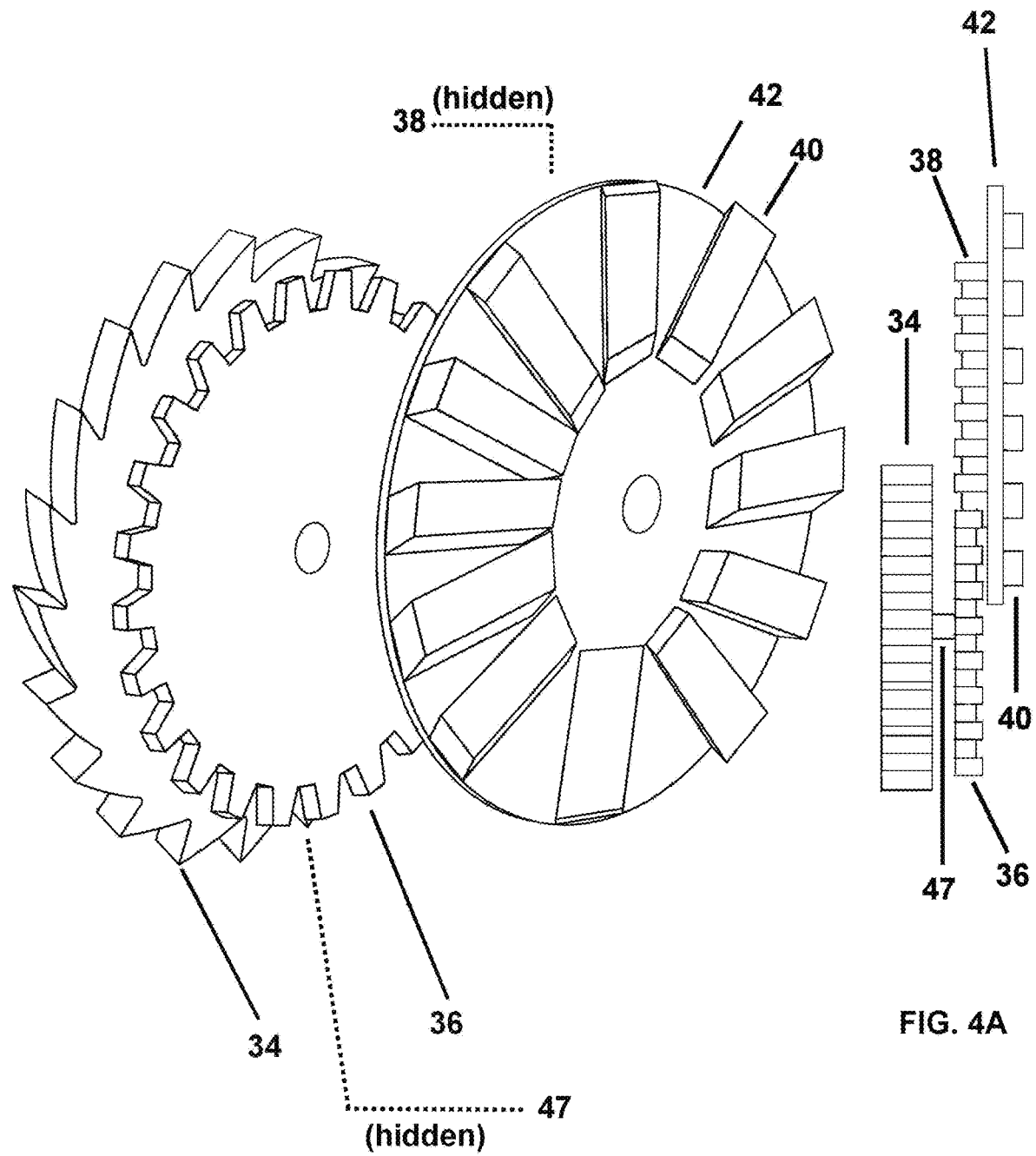
FIG. 4 shows the gear train that drives the rotatable disk with magnets.
FIG. 4A shows a side view of the gear train that drives the rotatable disk with magnets.
Figure 5:
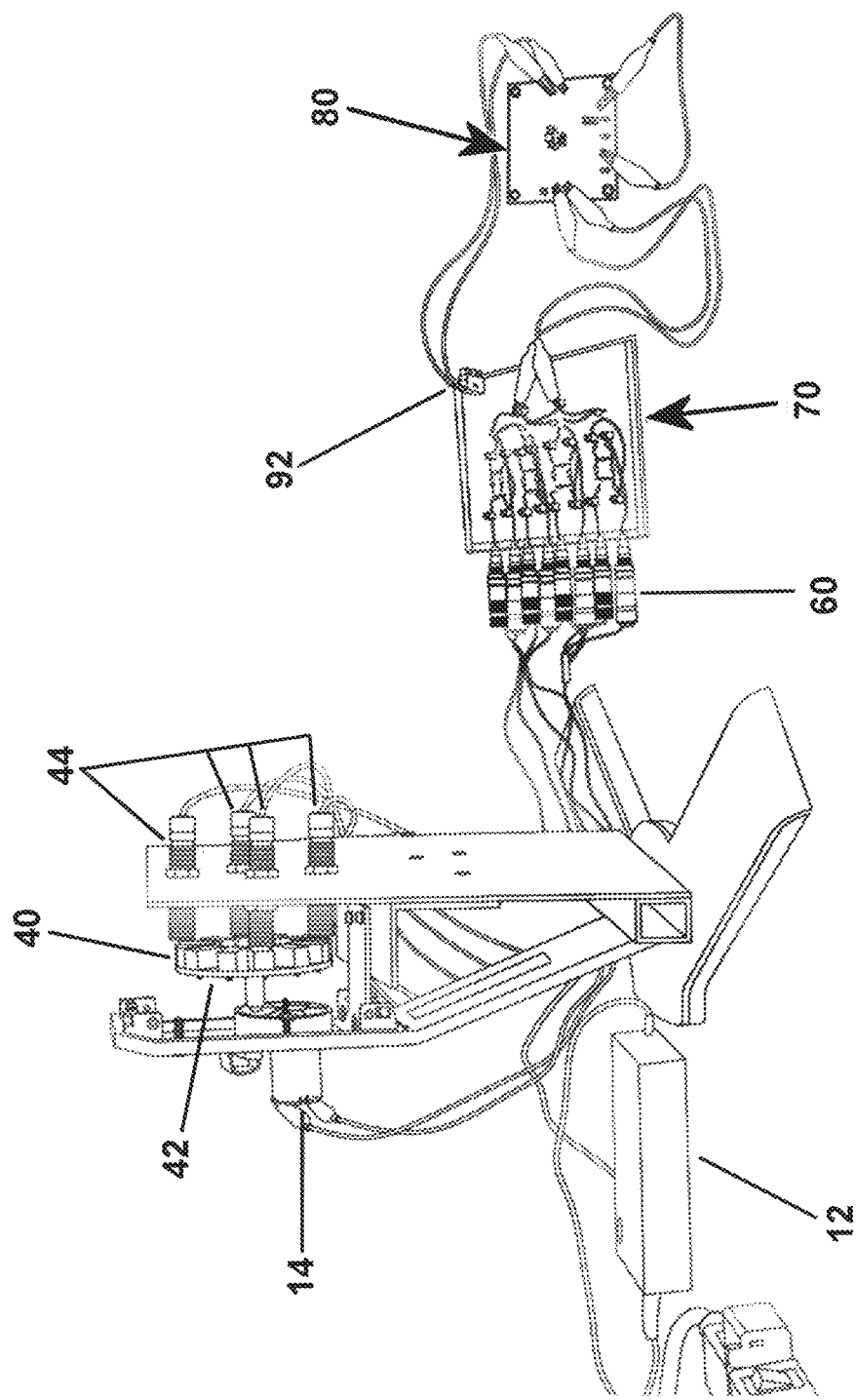
FIG. 5 shows the bench embodiment of the VRHRPG system.
Figure 6:
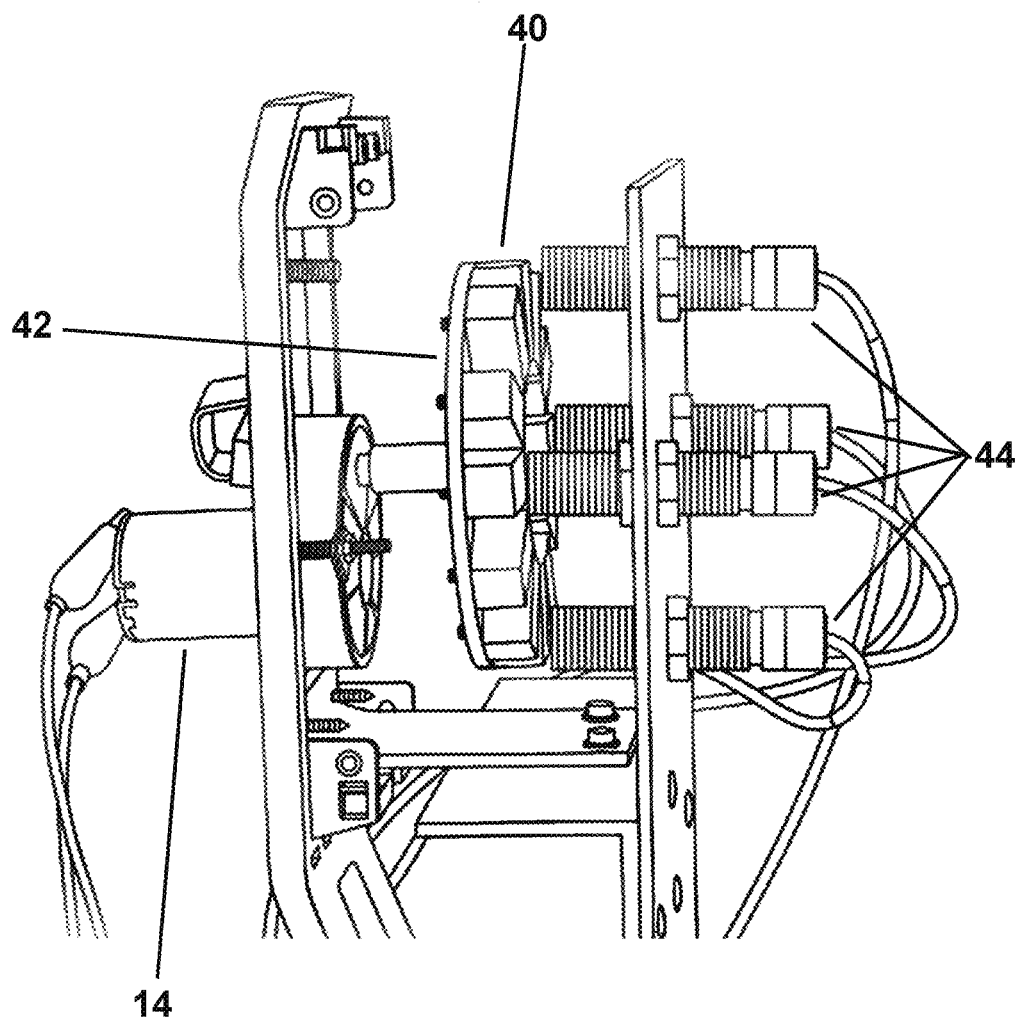
FIG. 6 shows the gear motor which rotates the magnets in relation to four VR sensors from the bench embodiment of the VRHRPG system.

FIG. 2 shows a packaged system 20, which is connected to a user-worn, partially elastic, torso garment 21. When the user inhales the torso garment 21 expands, which through action on ratchet gear system 30, causes the rotatable disks 42 with magnets 40 to be rotated. Components 40 and 42 are seen in FIGS. 4, 5 and 6. When the user exhales the torso garment 21 contracts, which produces a retracting spring force, which through an opposite action on ratchet gear system 30, causes the rotatable disk 42 with magnets 40 to continue rotating in the initial direction.

Figure 3:
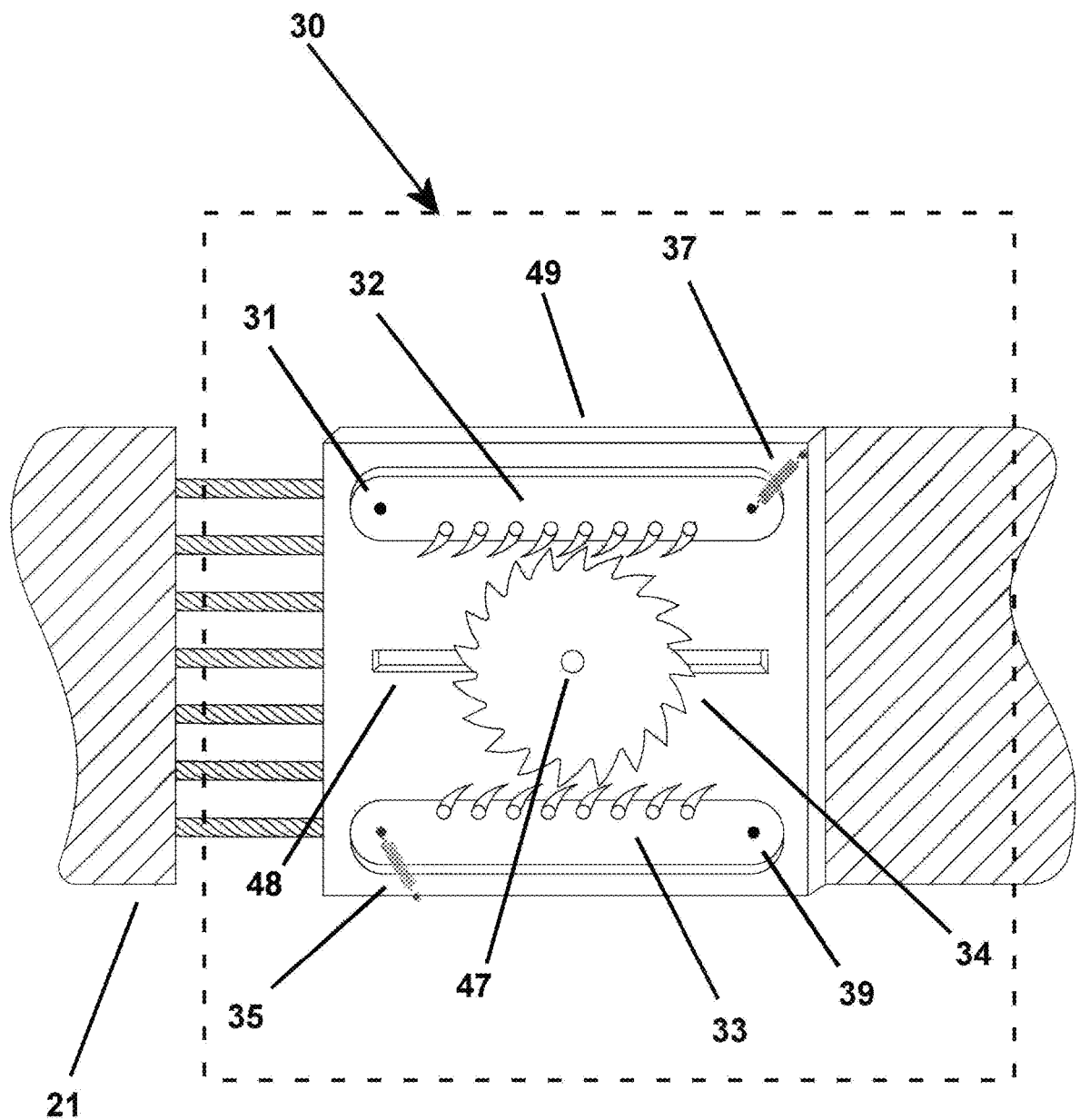
FIG. 3 shows the ratchet and gear mechanism that drives the rotatable disk with magnets in response to the user's respiration.

FIG. 3 shows the arrangement of a ratchet gear system 30, which includes a support frame 49, which is mechanically connected to torso garment 21, and a ratchet gear 34, which is allowed to rotate. However, gear 34 is fixed so that it does not translate. In addition, ratchet gear 34 is axially aligned and connected by a fixed rod 47 to cog gear 36 (Gear 36 is visible in FIG. 4). Rod 47 passes through a slot 48 in support frame 49 and rotates with ratchet gear 34 and cog gear 36 (seen in FIG. 4). Support frame 49 is positioned between ratchet gear 34 and cog gear 36 and translates past rod 47, when in motion. (The gear arrangement is seen in FIG. 4.) Ratchet gear 34 is characterized in that its teeth are oriented to face the opposite direction of the plurality of pawls on upper pawl assembly 32 and the plurality of pawls on lower pawl assembly 33.

The ratchets assemblies 32 and 33 are mounted on support frame 49 and are configured so that when the torso garment 21 expands (due to inhalation by user), support frame 49 and the ratchet assemblies 32 and 33, together, translate from their base position and the horizontal ratchet pawl assembly 32 engages the ratchet gear 34 and causes it to rotate in an initial direction. When the torso garment 21 contracts (due to exhalation by user), a retracting spring force is applied to support frame 49, which then translates, along with ratchet assembles 32 and 33, toward their base position; and the horizontal ratchet pawl assembly 32 disengages from the ratchet gear 34. During inhalation, engagement of the ratchet gear 34 is achieved by a spring 37, one end of which is attached to and pushes the ratchet pawl assembly 32 toward the ratchet gear 34. The non spring end of ratchet pawl assembly 32 is fixed but allowed to pivot by pivot pin 31. Pivot pin 31 and one end of spring 37 are attached to the support frame 49.

In addition, when the user exhales, a second ratchet pawl assembly 33 engages the ratchet gear 34 and drives it in the same direction as the initial direction. When ratchet pawl assembly 32 is engaged, ratchet pawl assembly 33 is disengaged. When ratchet pawl assembly 33 is engaged, ratchet pawl assembly 32 is disengaged. During exhalation, engagement of ratchet pawl assembly 33 is caused by the force generated by spring 35, one end of which is attached to and pushes the ratchet pawl assembly 33 toward the ratchet gear 34. The non spring end of ratchet pawl assembly 33 is fixed, but allowed to pivot by pivot pin 39. Pivot pin 39 and one end of spring 35 are attached to the support frame 49. The ratchet pawl assemblies, 32 and 33, automatically disengage when the ratchet pawl assemblies are pushed away by the ratchet gear 34 motion.

The ratchet pawl assemblies 32 and 33 and support frame 49, together, translate away from the base position when the user inhales and the translate in the opposite direction when the user exhales. The pawl assemblies 32 and 33 and support frame 49, together, can translate an initial distance and a return distance that are each, at least, equal to the maximum torso expansion from inhalation.

FIG. 4 shows two views (not to scale) of the gear train arrangement, which drives the rotatable disk 42 with magnets 40. The first view shows an arrangement with a cog gear 36 that is aligned axially and connected by a fixed rod 47 to the ratchet gear 34. Rod 47 and gear 38 are hidden in this view. The cog gear 36 is meshed with the drive gear 38. The drive gear 38, which is a cog gear, is axially aligned and fused to the back surface of the 10.16 cm (4 in) diameter rotatable disk 42, which holds twelve N42 Neodymium magnets 40 with dimensions 0.635 cm×0.635 cm×2.54 cm (¼ in×¼ in×1 in). Each magnet is arranged with its long axis radially aligned on the rotatable disk 42, such that they are adjacent to the disk 42 perimeter and uniformly spaced about the circumference. The magnets 40 are magnetized through their thickness and arranged such that the south poles are mounted against the front surface of the disk 42 and the north poles are exposed to air.

A second view (FIG. 4A), is a side view that shows how the gears mesh. In this view rod 47 and gear 38 are visible.

FIG. 5 shows the full arrangement of the bench embodiment of the VRHRPG system. The power supply 12 is connected to a gear motor 14. This arrangement is the simulation of block 16 in FIG. 1. The gear motor 14 drives the rotatable disk 42 with magnets 40, which rotates in front of and perpendicular to four VR sensors 44. The train of output voltage pulses 60 of the VR sensors 44 are fed to the diode board 70. The output of the diode board 70 is fed to the DC-to-DC converter 80. The combination of the power supply 12 and the gear motor 14 simulate the partially elastic torso garment 21, connected to the ratchet and gear system 30 and the gear train 36 and 38, which rotates the rotatable disk 42. The diode board 70 also holds a USB-A connector 92, which provides a regulated 5-volt output from the DC-to-DC converter 80.

FIG. 6 shows in greater detail the arrangement between the gear motor 14, the rotatable disk 42 with magnets 40 and the VR sensors 44. Four VR sensors 44 are spaced evenly around and perpendicular to the surface of the rotatable disk 42 with magnets 40, such that the sensors' pole pieces' north poles overlap the space inside and adjacent to the rotatable disk's 42 circumference. The face of the magnet 40, which is its north pole, rotates in front of the VR sensors 44. The VR sensors 44 contain a magnetic pole piece, which is positioned so that the north pole is exposed to air. Thus, the magnets 40 and the VR sensor pole piece both have their north poles facing each other. Having opposite poles for the magnets 40 and the VR sensors' 44 pole pieces tended to stall the rotatable disk's 42 motion. The target air gap between the face of the magnets 40, on rotatable disk 42, and the VR sensor's 44 pole piece is 0.0127 cm (0.005 in). FIG. 6 illustrates that there is a substantial air gap (approximately 0.0254 cm (0.10 inches)) between the magnets 40 and the sensors 44. This is due to eccentricity of the gear motor driveshaft rotation. As a result, there is a wobble in the rotatable disk 42, which forced the need for greater air gap in the bench embodiment. In the preferred embodiment, the rotatable disk 42 and the VR sensors 44 will be mounted in a precision fixture that maintains the proper air gap. In addition, in the preferred embodiment, the VR sensors 44 will be replaced with a reconfigured version 45 that is shorter, with a target length of 1 inch or less (See FIG. 11). However, this will increase the diameter of the VR sensor 45 since the number of wire coils will remain the same. Note, as was the case in the bench embodiment, the VR sensors 45 are spaced evenly around the rotatable disk's 42 circumference, such that the VR sensors' pole pieces' 46 north poles overlap the space inside and adjacent to the rotatable disk's 42 circumference. The face of the magnet 40, which is its north pole, rotates in front of and perpendicular to the VR sensors 45.

Figure 7:
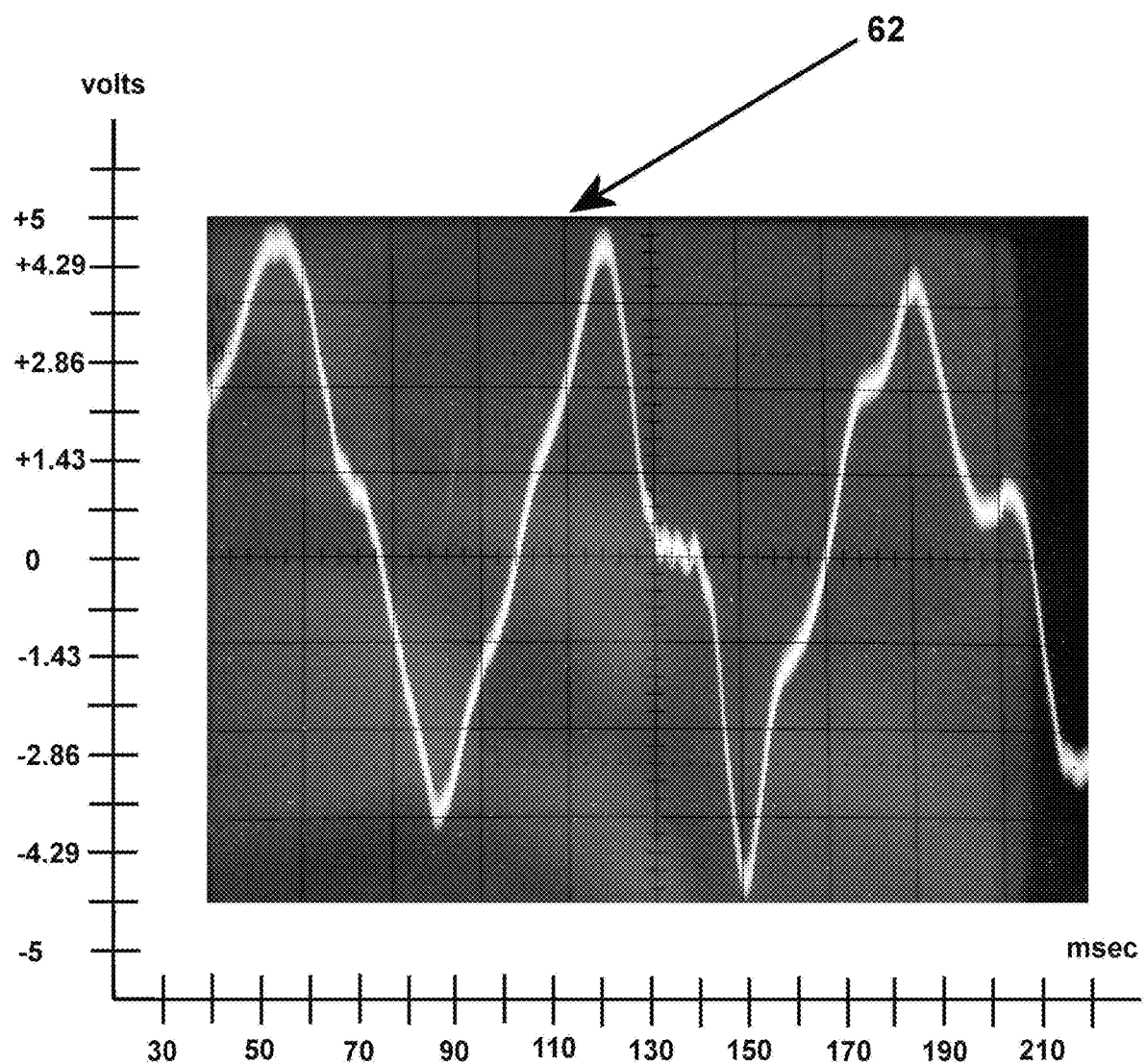
FIG. 7 shows a typical sinusoidal output produced by the VR sensors in the bench embodiment of the VRHRPG system.

FIG. 7 shows the sinusoidal output waveform 62 of the typical VR sensor 44 from the bench system. The waveform 62 varies because of the rotation eccentricity of the rotatable disk 42. However, in general, the best bench waveform 62, peak to valley, is 9.64 volts (3.40 Vrms). And the output waveform has a frequency of 15.38 Hz.

Calculation for Gear Multiplier and VR Sensor Output Frequency

For the preferred embodiment, the overall gear multiplier is calculated to achieve a VR sensor output frequency that is at least comparable to the bench embodiment. Thus, the calculation of the overall gear multiplier is based on the following:

The average period T for the VR sensor output signal in the bench embodiment is equal to 65 ms, which corresponds to a frequency F of 15.38 Hz. See waveform 62 in FIG. 7.

According to the literature the adult respiration rate is 12 to 20 breaths per minute (b/min).

According to the literature. The respiration rate during vigorous exercise is 60 breaths per minute (b/min).

According to the literature torso expansion doing respiration is between 5.08 cm (2 in) and 10.16 cm (4 in).

Assume the following:

The total torso expansion and contraction (TEC) is 20.32 cm/b (8 in/b) for a respiration rate (RR) of 12 b/min.

The total torso expansion and contraction (TEC) is 10.16 cm/b (4 in/b) for RR=20 b/min.

The total torso expansion and contraction ((TEC) is 20.32 cm/b (8 in/b) for an exercise respiration rate (RR) of 60 b/min.

GM=gear multiplier ($GM_b$ for bench embodiment)

$F_{12b}$=frequency of bench system=15.38 Hz=15.38 p/sec;

$F_{12}$=frequency for 12 b/min;

$F_{20}$=frequency for 20 b/min;

$F_{60}$=frequency for 60 b/min;

Rotatable disk 42 circumference C=31.93 cm (12.57 in), therefore the disk rotates 31.93 cm/rev (12.57 in/rev).

15.38 Hz=15.38 Pulses/sec (p/sec)

There are 12 magnets 40 on the rotatable disk 42, which means there are 12 sinusoidal pulses per revolution (p/rev).

For Respiration rate=12 b/min (breaths per minute):

$F=RR*TEC*Pulses/rev \div Distance/rev \div 60 \sec/\min * GM_b$ $F_{12b}$=12 b/min*20.32 cm/b*12 p/rev÷31.93 cm/rev÷60 sec/min*$GM_b$ ($F_{12b}$=12 b/min*8 in/b*12 p/rev÷12.57 in/rev÷60 sec/min*$GM_b$)

15.38=12 b/min*20.32 cm/b*12 p/rev÷31.93 cm/rev÷60 sec/min*$GM_b$ (15.38=12 b/min*8 in/b*12 p/rev÷12.57 in/rev÷60 sec/min*$GM_b$)

15.38=1.527*$GM_b$ $GM_b$=15.38÷1.527=10.06

For the preferred embodiment set GM=11 (note: a GM of 11 implies an effective gear ratio of 1:11).

For Respiration rate=12 b/min:

$F_{12}$=12 b/min*20.32 cm/b*12 p/rev÷31.93 cm/rev÷60 sec/min*GM ($F_{12}$=12 b/min*8 in/b*12 p/rev÷12.57 in/rev÷60 sec/min*GM)

$F_{12}$=12 b/min*20.32 cm/b*12 p/rev÷31.93 cm/rev÷60 sec/min*11

($F_{12}$=12 b/min*8 in/b*12 p/rev÷12.57 in/rev÷60 sec/min*11)

$F_{12}$=16.8 p/sec=16.8 Hz

For Respiration rate=20 b/min:

$F_{20}$=20 b/min*10.16 cm/b*12 p/rev÷31.93 cm/rev÷60 sec/min*GM ($F_{20}$=20 b/min*4 in/b*12 p/rev÷12.57 in/rev÷60 sec/min*GM)

$F_{20}$=20 b/min*10.16 cm/b*12 p/rev÷31.93 cm/rev÷60 sec/min*11

($F_{20}$=12 b/min*4 in/b*12 p/rev÷12.57 in/rev÷60 sec/min*11)

$F_{20}$=14.0 p/sec=14.0 Hz

For Respiration rate=60 b/min:

$F_{60}$=20 b/min*20.32 cm/b*12 p/rev÷31.93 cm/rev÷60 sec/min*GM ($F_{60}$=60 b/min*8 in/b*12 p/rev÷12.57 in/rev÷60 sec/min*GM)

$F_{60}$=60 b/min*20.32 cm/b*12 p/rev÷31.93 cm/rev÷60 sec/min*11

($F_{60}$=60 b/min*8 in/b*12 p/rev÷12.57 in/rev÷60 sec/min*11)

$F_{60}$=84.0 p/sec=84.0 Hz

Figure 11A:
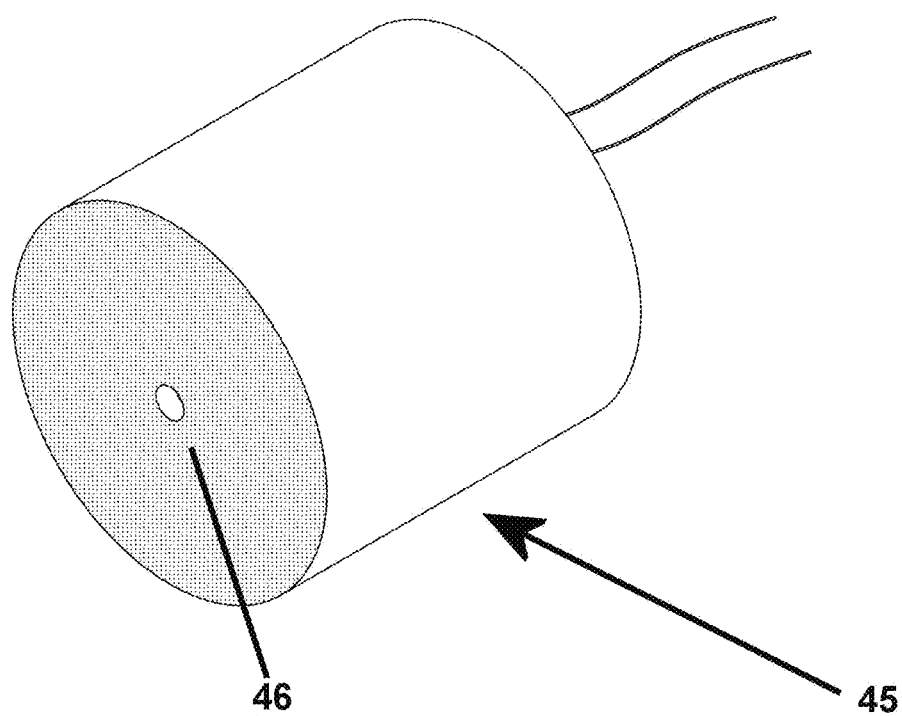
FIG. 11A shows a front view of the reconfigured VR sensor and its pole piece.
Figure 11:
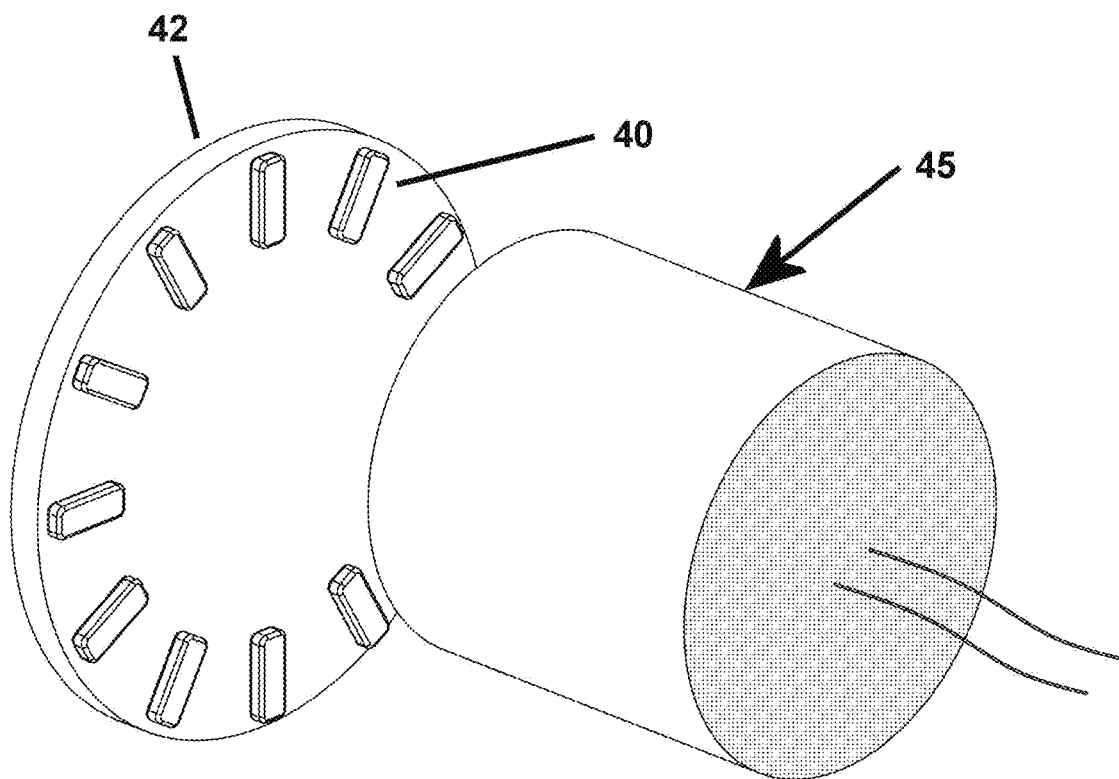
FIG. 11 shows the reconfigured VR sensor in relation to the rotatable disk and magnets.

Thus, in the preferred embodiment, the output frequency will be 16.8 Hz for a respiration rate of 12 breaths per minute, 14 Hz for a respiration rate of 20 breaths per minute and 84 Hz for a respiration rate of 60 breaths per minute. In addition, in the preferred embodiment, the waveform magnitudes will increase because of the increase in frequency and because of the improved distance tolerance between the magnet 40 face and the VR sensor's 44/45 pole piece 46. The reconfigured version of the VR sensor 45 and pole piece 46 is shown in FIG. 11.

Figure 8:
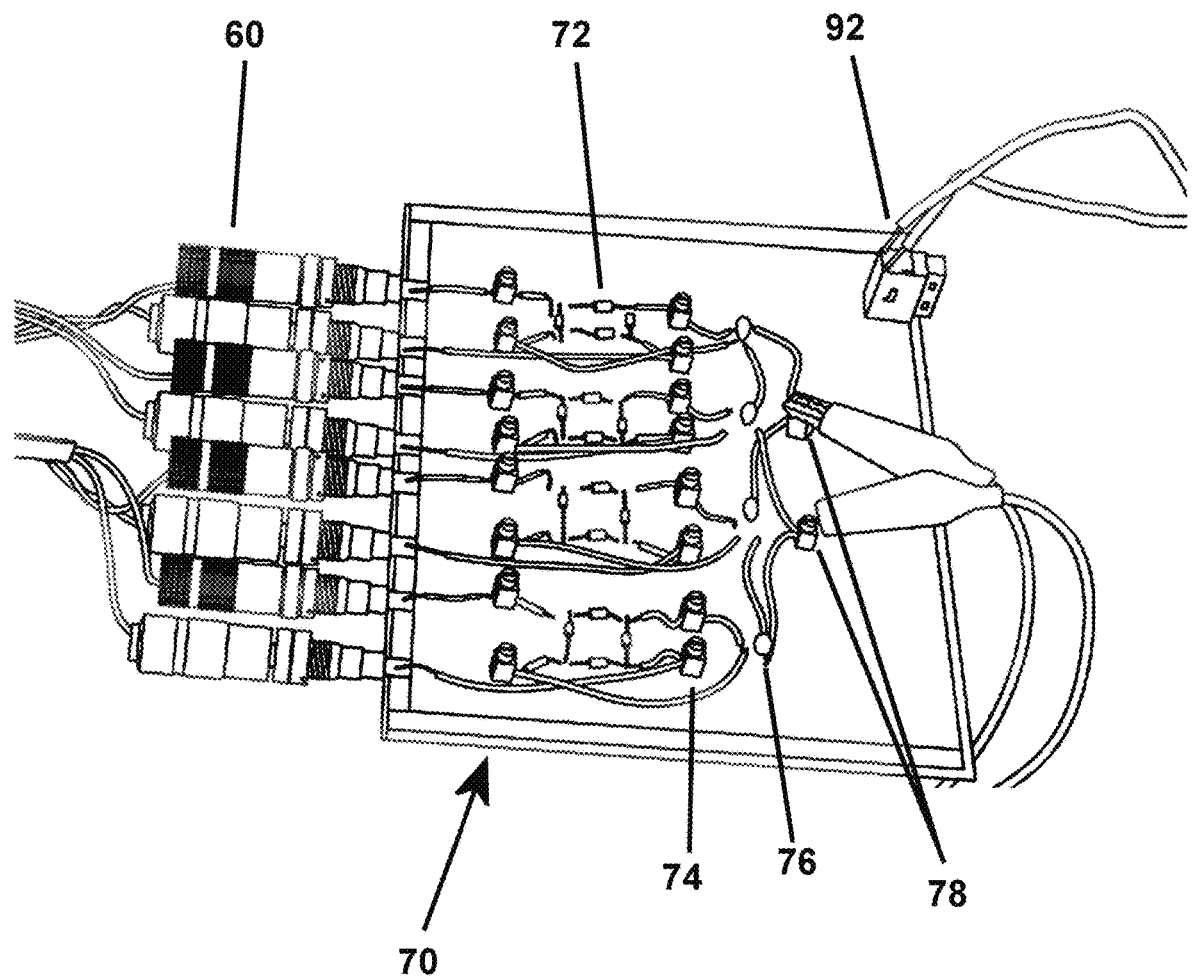
FIG. 8 shows the diode board, from the bench embodiment of the VRHRPG system, which converts the output pulses from the VR sensors to a composite DC voltage.

FIG. 8 shows the diode board 70 from the bench embodiment. It shows the inputs to the diode board, which are the output voltage pulses 60 from the VR sensors 44. The diode board 70 contains four small signal Schottky diode full wave bridge rectifiers 72. The diode board 70 also has a two-stage summing circuit in which the outputs from the full wave bridge rectifiers 72 are fed in pairs to a series summing circuit 74, which is electrically connected to a parallel summing circuit 76. The output of parallel summing circuit 76 is a composite output 78, which is fed to an electrical output device, which in the preferred embodiment is a DC-to-DC converter 80 (see FIGS. 5 & 10). It should be noted that the series-parallel configuration of the diode bridge rectifiers' outputs is not a required implementation. This arrangement was chosen to provide more voltage headroom to the DC-to-DC buck converter 80. Other arrangements such as an all-parallel diode bridge output are possible. The diode board 70 is also a mounting location for the USB-A port 92, which contains the output from the DC-to-DC buck converter 80.

Figure 9:
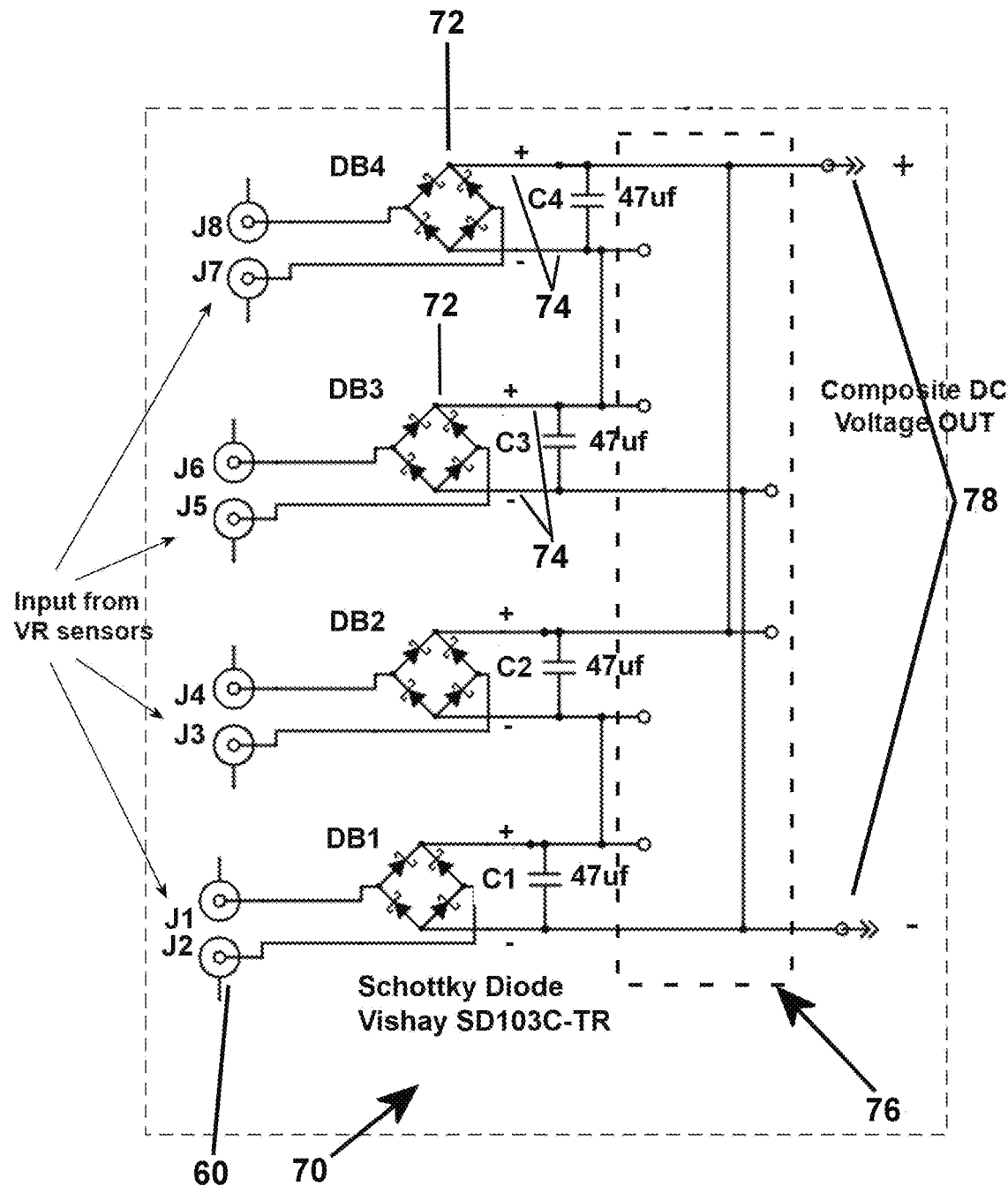
FIG. 9 shows a schematic of the diode board from the bench embodiment of the VRHRPG system.

FIG. 9 shows a schematic of the diode board 70 from the bench embodiment. It shows the inputs 60 to the diode board, which are the outputs from the VR sensors 44. The diode board 70 contains four small signal Schottky diode full wave bridge rectifiers 72. The diode board 70 also has a two-stage summing circuit in which the outputs from the full wave bridge rectifiers 72 are fed in pairs to a series summing circuit 74, which is electrically connected to a parallel summing circuit 76. The output of parallel summing circuit 76 is a composite output 78, which is fed to an electrical output device, which in the preferred embodiment is a DC-to-DC converter 80 (see FIG. 10). This schematic will be implemented in the preferred embodiment, with the exception that the circuitry will be expanded to accommodate the increased number of VR sensors 44/45.

Figure 10:
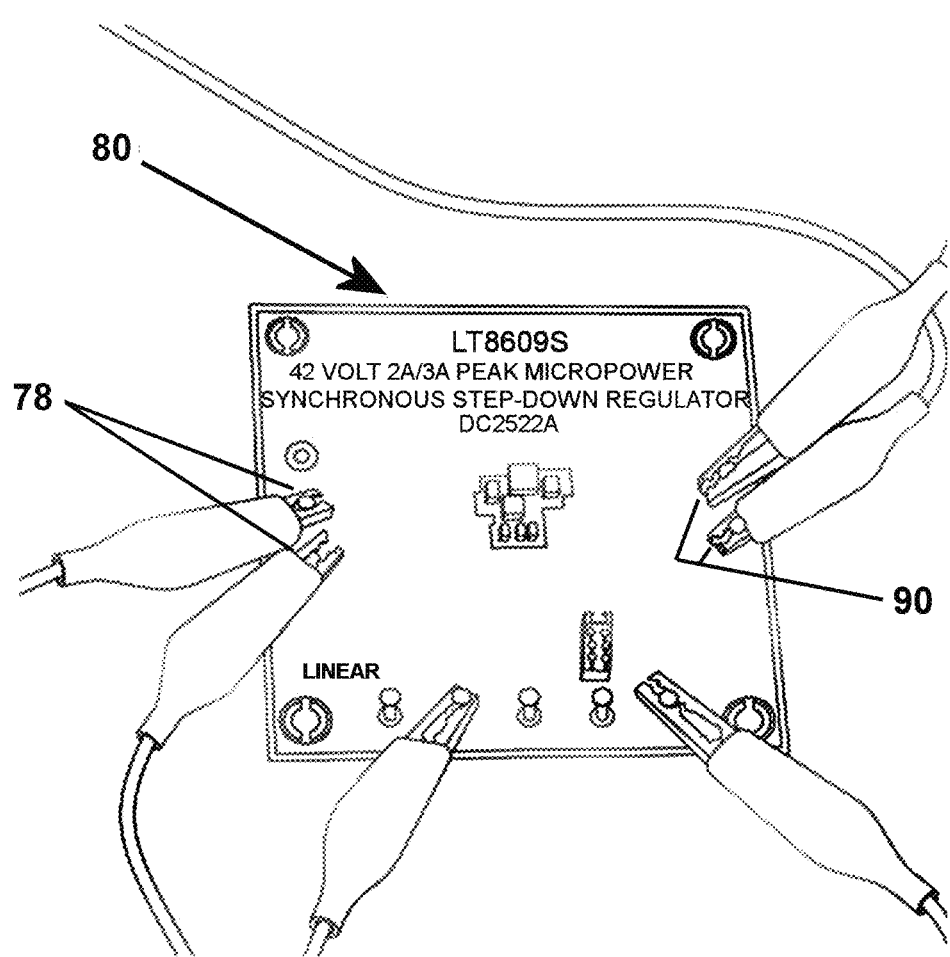
FIG. 10 shows the output device from the bench embodiment of the VRHRPG system, a DC-to-DC converter, which is used to provide a regulated DC output.

FIG. 10 shows the DC-to-DC converter 80, from the bench system, which is an Analog Devices demonstration board DC2522A. The DC2522A employs the LT8609S synchronous step-down switcher integrated circuit. The DC-to-DC converter 80 has input 78 which is a composite output from the diode board 70. The DC-to-DC converter 80 also has an output 90, which is a regulated 5 V DC voltage which is applied to a USB-A connector 92. Connector 92 can be seen in FIG. 8. However, it should be noted that the USB-A connector 92 is a placeholder and can be any appropriate DC current load or energy storage device. In the preferred embodiment, the DC-to-DC converter 80 circuitry will be integrated with the diode board 70 circuitry to provide a five-volt output. However, it should be noted that there are numerous DC-to-DC converter chips besides the LT8609S and a range of possibilities for values of the output voltage.

FIG. 11 shows the reconfigured VR sensor 45 in relation to the rotatable disk 42 with magnets 40. FIG. 11A also shows the VR sensor's 45 pole piece 46.

While the invention has been described in connection with a preferred embodiment, it is not intended to limit the scope of invention to the particular form(s) set forth, but on the contrary, it is intended to cover such alternatives, modifications, and equivalents as may be included within the spirit and scope of the invention as defined by the patent claims. For example, the DC-to-DC buck converter 80 could be replaced with a different type of DC-to-DC converter or an energy storage device.

Enhancements to the Preferred Embodiment

The preferred embodiment of the VRHRPG system is based on the bench embodiment (See FIGS. 1, 1A and 5 through 10). However, in addition to the changes identified in FIGS. 2, 3, 4 and 11, several enhancements can be made to provide for increased output power P.

The power P of the VRHRPG system is the product of the VR sensor (44)/(45) rectified voltage (V) and the system current (I). The power P can be increased by increasing the current (I) and/or the voltage (V). The system current (I) can be increased by increasing the number of VR sensors 44/45 in the system and/or the number of magnets 40 on rotatable disk 42, such that the number of VR sensor output pulses 60 per disk 42 revolution is increased.

The voltage V can be increased by increasing the value of N (which is the number of coil turns in the VR Sensor) and/or the $$\frac{d\Phi}{dt}$$

magnitude of the VR Sensors. In addition, the $$\frac{d\Phi}{dt}$$

magnitude can be increased by increasing the magnetic flux Φ and/or by increasing the VR sensor's 44/45 target velocity, where target velocity is the linear velocity of magnet 40 relative to the proximate VR sensor 44/45. Target velocity can be increased by increasing rotatable disk 42 diameter and/or by increasing the rotatable disk's 42 rotation speed, which is a function of respiration rate, the ratchet gear system 30 and the ratios of gears 36 and 38.

The power P of the VRHRPG system can be maximized by insuring the smallest practical air gap between the VR sensor's 44/45 pole piece 46 and the magnet's 40 face, with the minimum target air gap being 0.0127 cm (0.005 in). In addition, the maximum power P can be achieved when the VR sensor's 44/45 pole piece 46 fully passes over the magnet's 40 face. Therefore, the VR sensors 44/45 should be positioned in their fixture so that the VR sensors' pole pieces 46 overlap the space inside and adjacent to the rotatable disk's 42 circumference.

A description of the VRHRPG system enhancements of the preferred embodiment follows:

VR Sensor Design

In the preferred embodiment, if the VR sensor 44/45 is modified to increase its number of turns N, the output voltage will increase proportionately. Thus, doubling N will double the VR sensor's 44/45 output voltage, which will result in an output power, increase of 200%.

VR Sensor Air Gap

In the preferred embodiment, if the VR sensor 44/45 air gap is maintained at 0.01270 cm (0.005 in), the VR sensor's 44/45 output voltage is estimated be is at least twice the value seen in the bench embodiment. It is estimated that this will increase the system output power by 200%.

Eccentricity of Rotatable Disk's Rotation

In the preferred embodiment, the eccentricity of the rotatable disk's 42 rotation is eliminated. This is achieved by having better dimensional tolerances and increased precision in the fabrication of the preferred embodiment, as compared to the bench embodiment. As a result, the variation in the VR sensor's 44 air gap that is seen in the bench embodiment is eliminated. Some VR sensor 44 air gaps in the bench embodiment caused the VR sensor 44 output voltage pulses 60 to be 25% to 50% less than maximum. Thus, a correction of the eccentricity of the rotatable disk's rotation will increase the system power output by approximately 37½%.

VR Sensor Count

Increasing the number of VR sensors 44/45 from 4 to 8 (with appropriate rectification from a corresponding rectifier bridge circuit 72) will produce twice the signal current and therefore an increase in the system output power by 200%.

Magnetic Flux Φ

The bench embodiment uses grade N42 neodymium magnets 40 with dimensions 1.27 cm×1.27 cm×2.54 cm (0.5 in.×0.5 in.×1 in). In the preferred embodiment, a grade N52 neodymium magnet with the same dimensions will be used.

This will increase flux Φ, resulting in a magnetic force increase of 43.5%, which results in a $$\frac{d\Phi}{dt}$$

and output power, increase of 43.5%

Rotatable Disk Diameter

Increasing the rotatable disk 42 diameter from 10.16 cm (4 in) to 15.24 cm (6 in), will cause an increase in the VR sensor's $$44/45 \frac{d\Phi}{dt},$$

which increases output voltage 60 (and therefore the power). The resulting power increase is a ratio of the VR sensors' 44/45 target velocities, which is a ratio of the rotatable disks' 42 circumferences. Therefore, the power increase is:

$C_{15.24} \div C_{10.16} = 47.87$ cm÷31.93 cm=1.50

$(C_6 \div C_4 = 18.84$ in÷12.57 in=1.5)

Thus, the output power will increase by 150%. In addition, increasing the rotatable disk's 42 diameter to 15.24 cm (6 in) will permit the addition of 6 magnets 40. This will increase the magnet 40 count from 12 to 18. This will result in 150% increase in overall VR sensor 44/45 current, which will result in a power increase of 150%. In addition, increasing the rotatable disk 42 diameter to 15.24 cm (6 in) will increase the rotatable disk's 42 circumference from 31.93 cm (12.57 in) to 47.88 cm (18.85 in). This will permit the addition of 4 VR sensors 44/45 (for a total of 12), which will increase the current and therefore the output power by 150%. The resulting power increase from increasing the rotatable disk diameter from 10.16 cm (4 in) to 15.24 cm (6 in) is 1.50*1.50*1.50, which equals 3.38 or 338%.

Rotatable Disk Speed (Gear Ratio)

Increasing the system gear ratio (ratio of gear 36 to gear 38) increases the rotation speed of rotatable disk 42. As a result, doubling the gear ratio will result in a 200% increase in the VR sensor's 44/45 target velocity and therefore a 200% increase in the VR sensor's $$44/45 \frac{d\Phi}{dt}.$$

This will result in a 200% increase in the VR sensor's 44/45 output voltage 60, and therefore a 200% increase in system output power.

Therefore, the resulting output power increase due to all of the above enhancements is:

(2*2*1.375*2*1.435*3.38×2)=106.70(10.670%).

The measured output power of the bench system at a frequency of 15.38 Hz is 0.001344 Watts, where system frequency is defined by the rotatable disk's 42 rotation speed and the number of magnets 40 it hosts. However, because of the chosen gear multiplier (11) the frequency at 12 b/min will be 16.8 Hz. which will increase the output by a factor of 1.09, which equals $(F_{12} \div F_B)$, which equals (16.8÷15.38). Thus, the enhanced output power in the preferred embodiment will be at least 0.1563 Watts (0.001344*1.09*106.70)—assuming 12 breaths/min; or 0.1303 Watts $(0.1563*F_{20} \div F_{12})$—assuming 20 breaths/min; and 0.7815 Watts $(0.1563*F_{60} \div F_{12})$ assuming 60 breaths/min, where: $F_{12}=16.8$ Hz; $F_{20}=14$ Hz; and $F_{60}=84$ Hz (see calculations pages 19-21).

While the invention has been described in connection with a preferred embodiment and certain enhancements, it is not intended to limit the scope of invention or possible enhancements to the particular form(s) set forth, but on the contrary, it is intended to cover such alternatives, modifications, and equivalents as may be included within the spirit and scope of the invention as defined by the patent claims.

What is claimed is:

1. A device that generates electrical power from human respiration motion, named Variable Reluctance and Human Respiration Power Generator, (VRHRPG), comprising:

a ratchet gear system (30) for motion conversion;

a partially elastic torso garment (21), that is worn by a user and mechanically connected to said ratchet gear system (30), wherein the torso garment (21) is worn by said user, in an area where there is a maximum expansion during an inhalation;

a rotatable disk (42) which has a drive cog gear (38) axially aligned and fused to a back surface on said rotatable disk (42), wherein said drive cog gear (38) forms a gear train with a second cog gear (36), which is interfaced with said rachet gear system (30) so as to cause said rotatable disk (42) to rotate;

a plurality of magnets (40) wherein each of the plurality of magnets (40) has a north pole, wherein said plurality of magnets (40) are fixed on a front surface of said rotatable disk (42), wherein each of said plurality of magnets (40) has a flux Φ whereby each of said plurality of magnets (40) has a thickness through which each of said plurality of magnets is magnetized, wherein a plurality of south poles of said plurality of magnets (40) are fixed to said front surface of the rotatable disk (42) such that each said north pole of said plurality of magnets (40) is exposed; wherein said plurality of magnets (40) are each positioned on said rotatable disk (42), such that each of the plurality of magnets (40) has a longest axes that is radially aligned such that said plurality of magnets (40) are adjacent to and uniformly spaced about a perimeter of said rotatable disk (42);

a plurality of variable reluctance, VR, sensors (44,45), wherein each has a pole piece (46), fixed to a contained magnet that is encircled by a coil of wire with an N number of turns, whereby said plurality of VR sensors (44,45) are mounted in a fixture such that said plurality of VR sensors (44,45) are proximate to and perpendicular to the rotatable disk (42) with said plurality of magnets (40), whereby the plurality of VR sensors (44,45) are spaced evenly around a circumference of said rotatable disk (42) such that each said pole piece (46) of the plurality of VR sensors (44,45) is exposed such that each said pole piece (46) of the plurality of VR sensors (44,45) overlaps a space inside and adjacent to the perimeter of said rotatable disk (42) with said plurality of magnets (40); whereby each said north pole of said plurality of magnets (40) is exposed, such that said rotatable disk (42) rotates in front of and in close proximity to each said pole piece (46) of said plurality of VR sensors (44,45); wherein said plurality of VR sensors (44,45) each produce a series of output voltage pulses (60);

an electrical output device;

an electronic circuit board, described as a diode board (70), which electrically connects each of the plurality of VR sensors' (44,45) said series of output voltage pulses (60), to each of a plurality of diode bridge rectifier circuits (72), wherein said diode board (70) also contains a two-stage series-parallel summing circuit, with a plurality of series summing circuits (74) electrically connected to a parallel summing circuit (76), a composite DC output voltage (78) and a DC-to-DC converter; wherein said plurality of diode bridge rectifier circuits (72) produce a plurality of outputs that are series summed in pairs in said plurality of series summing circuits (74) then electrically connected in parallel in said parallel summing circuit (76); wherein said summing circuit (76) produces said composite DC output voltage (78), whereby the composite DC output voltage (78) is electrically connected to said electrical output device, which on the diode board is said DC-to-DC converter; and a packaged system (20) which is connected to the user-worn, partially elastic, torso garment (21) wherein said package system (20) includes said ratchet gear system (30), and said gear train with said second cog gear (36) and said drive cog gear (38); wherein said package system (20) also includes said rotatable disk (42) with said plurality of magnets (40), said plurality of VR sensors (44,45) and said diode board (70).

2. The device that generates electrical power from human respiration motion (VRHRPG), according to claim 1, whereby the composite DC output voltage (78) is electrically connected to said electrical output device.

3. The device that generates electrical power from human respiration motion (VRHRPG), according to claim 2, whereby the composite DC output voltage (78) is electrically connected to said electrical output device, which is an electrical energy storage device (85).

4. The device that generates electrical power from human respiration motion (VRHRPG), according to claim 2, whereby the composite DC output voltage (78) is electrically connected to said electrical output device, which is said DC-to-DC converter (80).

5. The DC-to-DC converter (80) of claim 4, which produces an electrical output (90), whereby said electrical output (90) is fed to a DC current load (92).

6. The device that generates electrical power from human respiration motion (VRHRPG) according to claim 1, wherein a power P, of the VRHRPG system, is the product of a rectified voltage V of each of the plurality of VR sensors (44,45) and a system current I, whereby the power P can be increased by increasing said system current I and/or by increasing said rectified voltage V.

7. The power P, according claim 6, wherein, said power P can be increased by increasing the rectified voltage V, wherein said N number of turns in said coil of wire in each of the plurality of VR sensors (44,45) are increased.

8. The power P, according claim 6, wherein said power P can be increased by increasing the rectified voltage V, whereby the magnitude of said flux Φ of each of the plurality of magnets (40) is increased, such that a flux rate of change with respect to time, a mathematical derivative, that is expressed as a $$\frac{d\Phi}{dt},$$

of each of said plurality of VR sensors (44,45) is increased.

9. The power P, according claim 6, wherein said power P can be increased by increasing the rectified voltage V, by increasing a rotation speed of said rotatable disk (42), such that a target velocity of each of said plurality of VR sensors (44,45) is increased, wherein said target velocity is the linear velocity of said plurality of magnets (40) relative to a proximate VR sensor (44,45) of the plurality of VR Sensors (44,45), whereby said proximate VR sensor's (44)/(45) said $$\frac{d\Phi}{dt}$$

is increased; wherein said rotatable disk's (42) said rotation speed is a function of said respiration motion, the rachet gear system (30) and a ratio of said second cog gear (36) and said drive cog gear (38).

10. The power P, according claim 6, wherein said power P can be increased by increasing the rectified voltage V by increasing a radius of the rotatable disk (42) such that each of the plurality of VR sensor's (44,45) said target velocity is increased, whereby each of the plurality of VR sensor's (44,45) said $$\frac{d\Phi}{dt}$$

is increased.

11. The power P, according the claim 6, wherein said power P can be increased by increasing said system current I, whereby the plurality of VR sensors (44,45) is increased.

12. The power P, according the claim 6, wherein said power P can be increased by increasing the system current I, whereby the radius of the rotatable disk (42) is increased, such that said plurality of VR sensors (44,45) can be increased, whereby the system current I is increased and said plurality of magnets (40) can be increased, such that each of the plurality of VR sensors (44,45) said series of output voltage pulses (60) per said rotatable disk (42) revolution is increased, whereby the system current I is increased.

\* \* \* \* \*